United States Patent
Cooper et al.

(10) Patent No.: US 8,279,764 B2
(45) Date of Patent: Oct. 2, 2012

(54) METHOD AND APPARATUS FOR SELECTING A NETWORK ELEMENT FOR TESTING A NETWORK

(75) Inventors: Michael J. Cooper, Marietta, GA (US);
Thomas R. Keske, Randolph, MA (US);
Veronica M. Lobo, Sharon, MA (US);
John L. Moran, Uxbridge, MA (US);
Brian K. Thibeault, Attleboro, MA (US)

(73) Assignee: General Instrument Corporation, Horsham, PA (US)

( * ) Notice: Subject to any disclaimer, the term of this patent is extended or adjusted under 35 U.S.C. 154(b) by 711 days.

(21) Appl. No.: 11/752,039

(22) Filed: May 22, 2007

(65) Prior Publication Data

US 2008/0291840 A1     Nov. 27, 2008

(51) Int. Cl.
*G01R 31/08* (2006.01)
*G06F 11/00* (2006.01)
*G08C 15/00* (2006.01)

(52) U.S. Cl. ...................................... 370/252; 370/227
(58) Field of Classification Search .......... 370/242–253, 370/437, 230, 232, 235
See application file for complete search history.

(56) References Cited

U.S. PATENT DOCUMENTS

| | | | |
|---|---|---|---|
| 6,310,909 B1 * | 10/2001 | Jones ............................. | 375/220 |
| 6,334,219 B1 | 12/2001 | Hill et al. | |
| 6,606,351 B1 | 8/2003 | Dapper et al. | |
| 6,700,875 B1 | 3/2004 | Schroeder et al. | |
| 6,757,253 B1 | 6/2004 | Cooper et al. | |
| 6,985,437 B1 | 1/2006 | Vogel | |
| 2001/0055319 A1 | 12/2001 | Quigley et al. | |
| 2003/0043732 A1 * | 3/2003 | Walton et al. .................. | 370/208 |
| 2003/0149991 A1 * | 8/2003 | Reidhead et al. ............. | 725/119 |
| 2003/0200317 A1 * | 10/2003 | Zeitak et al. .................. | 709/226 |
| 2005/0025145 A1 * | 2/2005 | Rakib et al. ................... | 370/389 |
| 2007/0206625 A1 * | 9/2007 | Maeda .......................... | 370/437 |

* cited by examiner

*Primary Examiner* — Mark Rinehart
*Assistant Examiner* — Maharishi Khirodhar
(74) *Attorney, Agent, or Firm* — Lori Anne D. Swanson

(57) ABSTRACT

A network element is identified from among a plurality of network elements to be used to test parameters of a network. The use of one network element to test the network provides more reliable results than using random communications from a plurality of network elements. The test network element is identified using testing pool definitions which may be provided by a network operator. The testing procedure using the single network element may use multiple pings to reduce the affect of transient responses on the network.

14 Claims, 4 Drawing Sheets

METHOD AND APPARATUS FOR SELECTING A NETWORK ELEMENT FOR TESTING A NETWORK

FIELD OF THE INVENTION

This disclosure is directed toward determining a proper network element to be used in testing parameters of a network. More particularly, this disclosure is directed toward determining a network element to be used to communicate with a network controller to measure and monitor parameters of a network.

BACKGROUND OF THE INVENTION

Coaxial cable television systems have been in widespread use for many years and extensive networks have been developed. The extensive and complex networks are often difficult for a cable operator to manage and monitor. A typical cable network generally contains a headend which is usually connected to several nodes which provide content to a cable modem termination system (CMTS) containing several receivers, each receiver connects to several network elements of many subscribers, e.g., a single receiver may be connected to hundreds of network elements. In many instances several nodes may serve a particular area of a town or city. The network elements communicate to the CMTS via upstream communications on a dedicated band of frequency.

Cable networks are also increasingly carrying signals which require a high quality and reliability of service, such as voice communications or Voice over IP (VoIP) communications. Any disruption of voice or data traffic is a great inconvenience and often unacceptable to a subscriber. Various factors may affect the quality of service, including the quality of the upstream channels. Cable networks use various management techniques to control their networks, including return path spectrum management techniques. Return path spectrum management generally allows a cable network operator to reassign network elements to different communication parameters or different communication devices, e.g. receivers, to optimize use of the bandwidth spectrum available under certain conditions.

Traditional return-path spectrum management techniques in the cable industry generally revolve around three classical approaches: 1) fast Fourier transform (FFT) or traditional return-path noise power measurements, 2) Packet or Bit error rate tests, and 3) hop-and-hope or trial and error approaches. Clearly the third approach is a poor solution. The second approach requires longer measurement times due to the long period required to collect a statically significant numbers of packets/bits on which to base a metric and in addition, is subject to the random nature of which network elements are sending data (for example, poor performers might bias the results). In addition, the second approach requires the network to make errors prior to triggering network changes. For applications which require error-free or near error-free communications, this is an unacceptable approach. The first approach is solely based upon noise power measurements and requires that the channel be deactivated while the actual noise power measurement is made. A better approach is one which does not impact active data services, considers both noise and distortion affects, and indicates when signal quality is marginal but not yet making actual errors. The modulation error ratio (MER) is often considered the perfect measurement. However, MER for a single channel can vary a great deal (4 to 12 dB) depending upon which cable modem (network element) is selected for the measurement. Further, transient conditions can impact single measurements and must be understood in order to make accurate spectrum management decisions.

Previous techniques which focus on packet/bit error rates or traditional power based Modulation Error Ratio (MER) measurements generally use a composite (average) MER to evaluate the currently active channel and base modulation agility decisions. This approach, however, contains two significant weaknesses: 1) the composite MER reflects the "currently active" cable network elements as measured by data being passed on the upstream, and 2) the composite MER is an average which means that (generally) half the network elements are exhibiting MERs which are lower while many are exhibiting MERs which are higher.

Depending upon what the variance of MER is across the network element population, the range of actual MER performance of the network element population may be wide or narrow. When utilizing the average MER to monitor modulation changes, a narrow distribution of MER values among a plurality of network elements (meaning all network elements are yielding very similar MER readings) are good and allow the network operator to make modulation changes in which all network elements may continue to pass data. However, if the distribution is wide, and the network operator bases the modulation configuration changes on the average, there is a significant risk that some of the network elements (which are operating at MERs much lower than the channel average) will no longer be able to pass data on such a channel. For example, typical plant conditions are expected to yield a spread of between 4 and 12 dB. With 3 dB differences required to support each modulation type (QPSK, 8QAM, 16QAM, 32QAM, 64QAM, 128QAM, 256QAM), this implies that network elements are typically distributed across 2 to 4 different supported modulation types.

Moreover, the composite channel MER only reflects the MER for those bursts received since the last channel MER reading. Thus, for example, if the MER readings are taken every 10 seconds, and during those 10 seconds, only 3 cable network elements were passing any upstream data, then the composite MER reflects the average of the MER from only those three network elements. If these network elements were network elements were located at taps which resulted in better performance from an MER perspective, then the measurement would be unfairly influenced with a better MER than what would be reflected if all network elements were averaged. This could cause the network operator to elevate the modulation above a level supported by some of the network elements on the network. Similarly, if we continue with the example, if the 3 transmitting cable network elements were located at taps which resided at poor locations within the plant, then the measurement would be unfairly influenced with a worse MER than what would be reflected by a true average of all of the network elements. In this case, the network operator may lower the modulation agility to a level below that desired, thus achieving less than optimal throughput. Accordingly, the composite channel MER metric does not provide a consistent view of the quality of the channel but instead reflects the quality related to only the network elements active at any particular instant in time. If we base modulation agility off of this inconsistent composite MER metric, we will get unpredictable results. Accordingly, the relatively narrow set of network elements used to determine the average MER at any one time often further distorts the accuracy of the MER measurement with respect to a network element which was not used in the test.

SUMMARY OF THE INVENTION

The disclosure documents a specific process for selecting remote devices on the cable plant in which to perform spectral quality measurements. Use of this process reduces the number of measurements required to effectively manage the bandwidth while assuring that decisions are best for all devices on the plant.

In accordance with principles of the invention, an apparatus of the invention may comprise: a microprocessor configured to sort a plurality of network elements according to a network parameter indicative of performance of the network element, to select a network element of the plurality of network elements as a test network element, and to send a test signal to the test network element; and a receiver configured to receive a response to the test signal from the test network element, wherein the apparatus monitors a network using responses to the test signal from only the test network element, which is indicative of the communication parameters of a majority of the network elements of the plurality of network elements, to control a parameter of the network. The plurality of network elements may be sorted according to their signal to noise ratio. The test network element may be determined according to a testing pool definition. The testing pool definition may include a percentage of network elements which support a modulation profile. The testing pool definition may include a number of elements which may be excluded from a testing pool. The testing pool definition may include the network element with the lowest signal to noise ratio.

In accordance with the principles of the invention, a method of identifying a network element to use for testing a network may comprise the steps of: sorting a plurality of network elements based on a network parameter; applying testing pool definitions to the plurality of network elements; and selecting a network element from the plurality of network elements as a test network element based on the testing pool definitions, wherein a network uses responses from only the test network element, which is indicative of the communication parameters of a majority of the network elements of the plurality of network elements, to control a parameter of the network. The plurality of network elements may be sorted according to their signal to noise ratio. The test network element may be determined according to a testing pool definition. The testing pool definition may include a percentage of network elements which support a modulation profile. The testing pool definition may include a number of elements which may be excluded from a testing pool. The testing pool definition may include the network element with the lowest signal to noise ratio. The controlled parameter of the network may include one of a modulation type and a channel frequency.

In accordance with the principles of the invention a computer readable medium may carry instructions for a computer to perform a method of identifying a network element to use for testing a network comprising the steps of: sorting a plurality of network elements based on a network parameter; applying testing pool definitions to the plurality of network elements; and selecting a network element from the plurality of network elements as a test network element based on the testing pool definitions, wherein a network uses responses from only the test network element, which is indicative of the communication parameters of a majority of the network elements of the plurality of network elements, to control a parameter of the network. The plurality of network elements may be sorted according to their signal to noise ratio. The test network element may be determined according to a testing pool definition. The testing pool definition may include a percentage of network elements which support a modulation profile. The testing pool definition may include a number of elements which may be excluded from a testing pool. The testing pool definition may include the network element with the lowest signal to noise ratio. The controlled parameter of the network may include one of a modulation type and a channel frequency.

BRIEF DESCRIPTION OF THE DRAWINGS

The following drawings serve to illustrate the principles of the invention.

DETAILED DESCRIPTION OF THE INVENTION

The invention allows an operator to select a network element to more accurately make measurements of parameters in a cable plant. This invention is based upon an improved burst modulation error ratio (MER) measurement approach which considers both noise and distortion affects on digital communications without requiring significant time or disruption to active services. MER requires a reference signal to pass through the communications channel. While any network element (cable modem) may act as a transmitting device, correctly characterizing the channel to support future bandwidth optimization decisions requires unique devices to be selected. This invention specifies an optimal approach for selecting the transmission device or network element. This is often critical to the success of a network testing and management algorithm because of the wide variance (4 to 12 dB) in measurement results that occurs depending upon which device is selected.

In a preferred implementation, the selected network elements are serviced by, or reside on, the same optical node or serving group. A methodology for isolating devices which reside on the same optical node or serving group is provided in a commonly assigned disclosure Attorney Docket No. BCS04122, entitled METHOD AND APPARATUS FOR GROUPING TERMINAL NETWORK DEVICES filed on Sep. 5, 2006 and assigned U.S. Ser. No. 11/470,034, herein incorporated by reference in its entirety.

Figure 1:
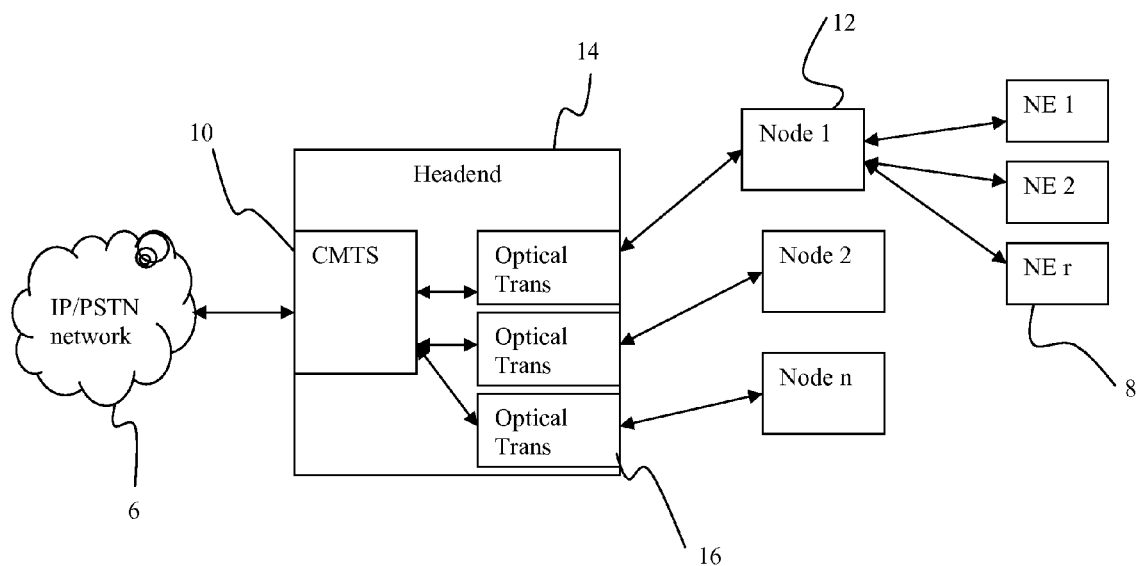
FIG. 1 illustrates an exemplary network in accordance with the principles of the invention.

FIG. 1 illustrates an exemplary network in which a plurality of terminal network elements 8 (e.g. cable modems, set top boxes, televisions equipped with set top boxes, or any other element on a network such as an HFC network) are connected to a cable modem termination system (CMTS) 10 located in a headend 14 through nodes 12 and one or more taps (not shown). In an exemplary arrangement, headend 14 also contains an optical transceiver 16 which provides optical communications through an optical fiber to the plurality of nodes 12. The CMTS 10 connects to an IP or PSTN network 6. Those of skill in the art will appreciate that there may be a plurality of nodes 12 connected to a headend, and a headend may contain a plurality of CMTS 10 units, each of which contain a plurality of receivers (e.g. 8 receivers) each of which communicate with a plurality (e.g. 100 s) of network elements 8. The CMTS 10 may also contain a spare receiver which is not continuously configured to network elements 8, but may be selectively configured to network elements 8. Use of a spare receiver is described in commonly assigned Attorney Docket No. BCS03827, assigned U.S. Ser. No. 11/171,066, filed on Jun. 30, 2005 and titled Automated Monitoring of a Network, herein incorporated by reference in its entirety.

Figure 2:
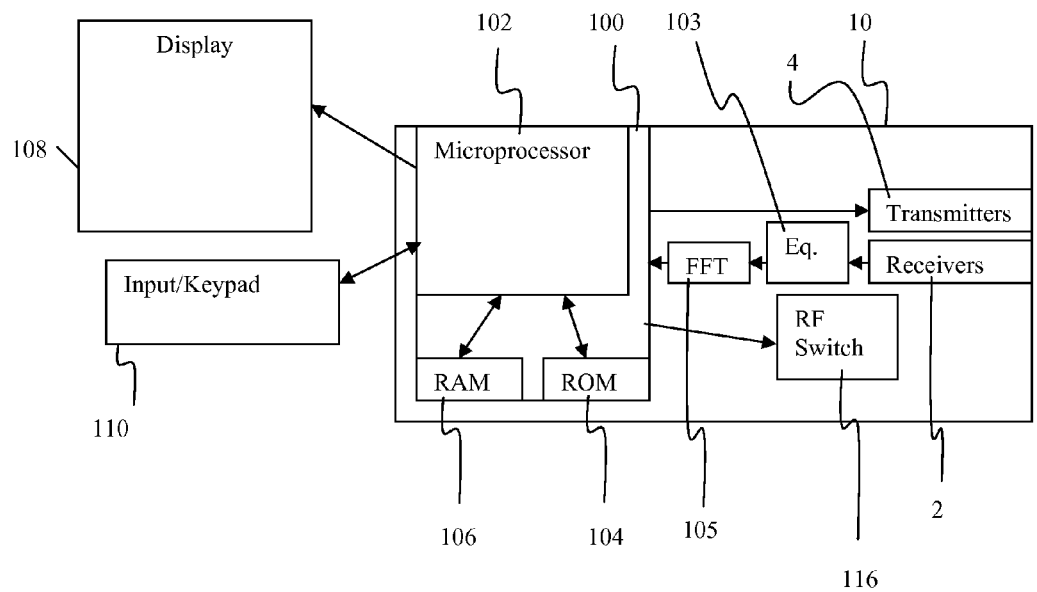
FIG. 2 illustrates a logical architecture of an exemplary CMTS 10 to facilitate an understanding of the invention.

FIG. 2 illustrates a logical architecture of an exemplary CMTS 10 to facilitate an understanding of the invention. As illustrated in FIG. 2, CMTS 10 may contain a processing unit 100 which may access a RAM 106 and a ROM 104, and may control the operation of the CMTS 10 and RF communication signals to be sent by the network elements 8 to the CMTS 10. Processing unit 100 preferably contains a microprocessor 102 which may receive information, such as instructions and data, from a ROM 104 or RAM 106. Processing unit 100 is preferably connected to a display 108, such as a CRT or LCD display, which may display status information such as whether a station maintenance (SM) is being performed or a receiver is in need of load balancing. Those of skill in the art will appreciate that a SM is a type of burst within the DOCSIS standard which maintains a tuned configuration for a network element to allow it to communication with the CMTS. An input keypad 110 may also be connected to processing unit 100 and may allow an operator to provide instructions, processing requests and/or data to processor 100.

RF transceiver (transmitter/receiver) unit preferably contains a plurality of transmitters 4 and receivers 2 to provide bi-directional communication with a plurality of network elements 8 through optical transceivers 16, nodes 12 and a plurality of network taps (not shown). Those of skill in the art will appreciate that CMTS 10 may contain a plurality of RF receivers 2, e.g. 8 RF receivers and a spare RF receiver. Each RF receiver 2 may support over 100 network elements. The RF receiver 2, such as a Broadcom 3140 receiver (receiver), preferably provides the received RF signals to an equalizer 103 which is used to acquire equalizer values and burst modulation error ratio (MER) measurements, packet error rate (PER) and bit error rate (BER). Equalizer 103 is preferably a multiple tap linear equalizer (e.g. a 24 tap linear equalizer), which also may be known as a feed forward equalizer (FFE). Equalizer 103 may be integrally contained in RF receiver 2 or may be a separate device. RF receiver 2 may also include FFT module 105 to support power measurements. The communication characteristics of each receiver 2 may be stored on ROM 104 or RAM 106, or may be provided from an external source, such as headend 14. RAM 104 and/or ROM 106 may also carry instructions for microprocessor 102.

Figure 3:
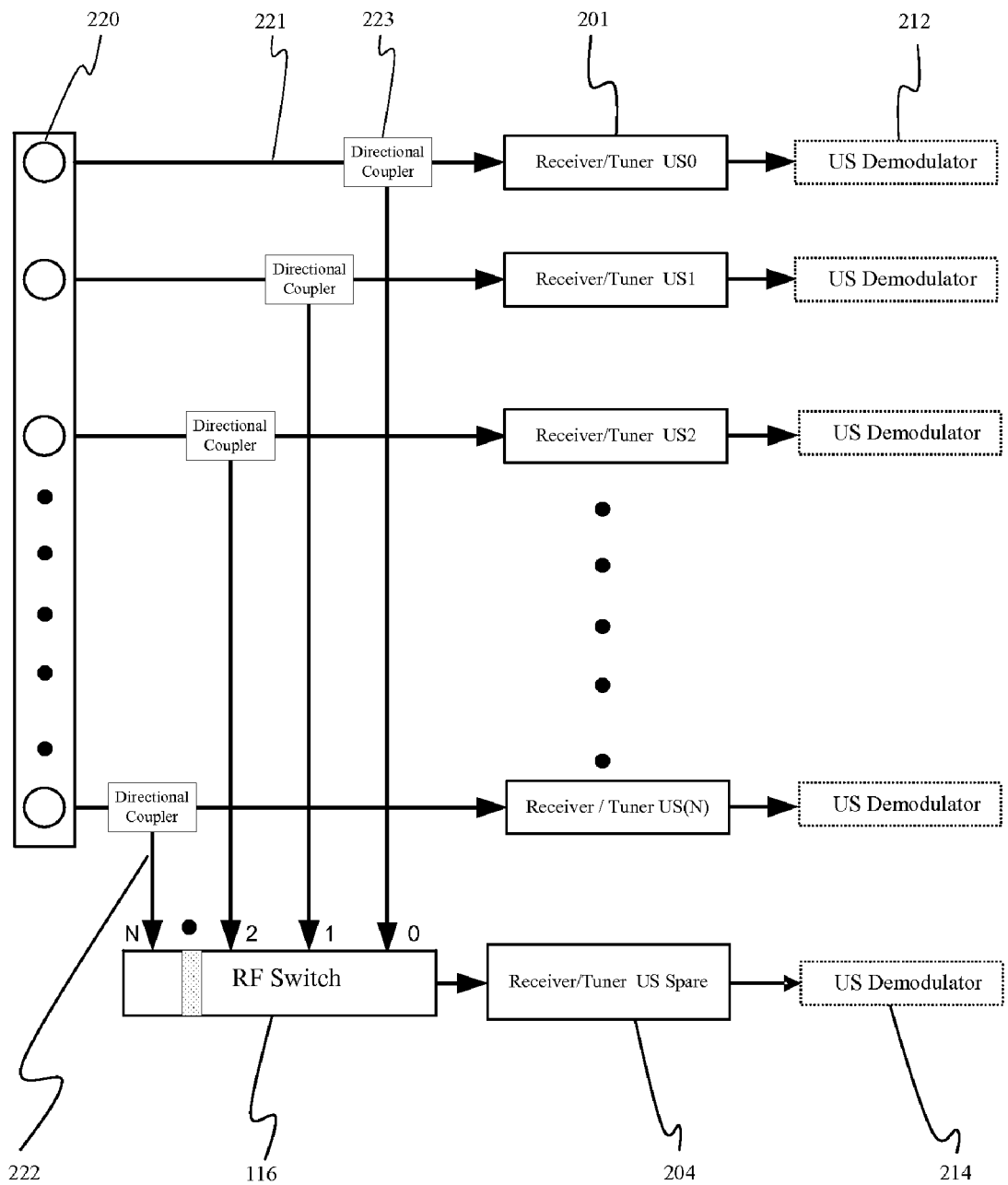
FIG. 3 illustrates a logical arrangement of a group of receivers to facilitate an understanding of the invention.

FIG. 3 illustrates a logical arrangement of a group of receivers 201 to facilitate an understanding of the invention. As illustrated in FIG. 3 a spare receiver 204 may be tapped into each of the primary receiver ports 220 (e.g. R0-R7) in a non-intrusive manner. As illustrated, CMTS receiver ports 220, which may be in the form of Amphenol connectors, are provided to allow cables, e.g. coaxial cables, (not shown) to be connected with primary receivers 201.

Spare receiver 204 preferably taps, via a directional coupler 223, into signal lines 221 of primary receiver ports 220 via signal lines 222, and the taps are preferably located where the cable signal comes from receiver ports 220 into the receivers 201 so both the connected primary receiver 201 and the spare receiver 204 may receive the same signal. Those of skill in the art will appreciate that each of the primary receivers 201 (e.g. receivers R0-R7) receive signals according to different communication characteristics, e.g. communication on a different frequency (RF band) and communication protocols. Spare receiver 204 is preferably tunable to the RF bands of each of the primary receivers 201. Preferably, the spare receiver 204 connects (matrices) with only one primary receiver 201 at a time.

When a cable operator initiates a testing operation they may select any registered network element of their choice or the CMTS 10 may select the network element for them. Once the network element has been selected it is moved (tuned to the frequency) to the spare receiver testing data is passed to it and the results are measured. Once the testing measurements are completed the network element is moved back (instructed to retune to frequency of the primary receiver) to its original primary receiver. This whole process is preferably performed without deregistering the network element from the network to avoid disrupting the subscriber's service or any other services on the primary receiver to other subscribers.

The test signals may be implemented using one of the available upstream DOCSIS bandwidths, e.g. 200 kHz, 400 kHz, 800 kHz, 1600 kHz, 3200 kHz or 6400 kHz. A preferred implementation may use the narrow 800 kHz bandwidth at the upper band edge where diplexer rolloff is significant since narrow bandwidths minimize the amount of clean spectrum required within the return path, and wider bandwidths are used where available spectrum permits in order to gain improved resolution in the measurements.

Figure 4:
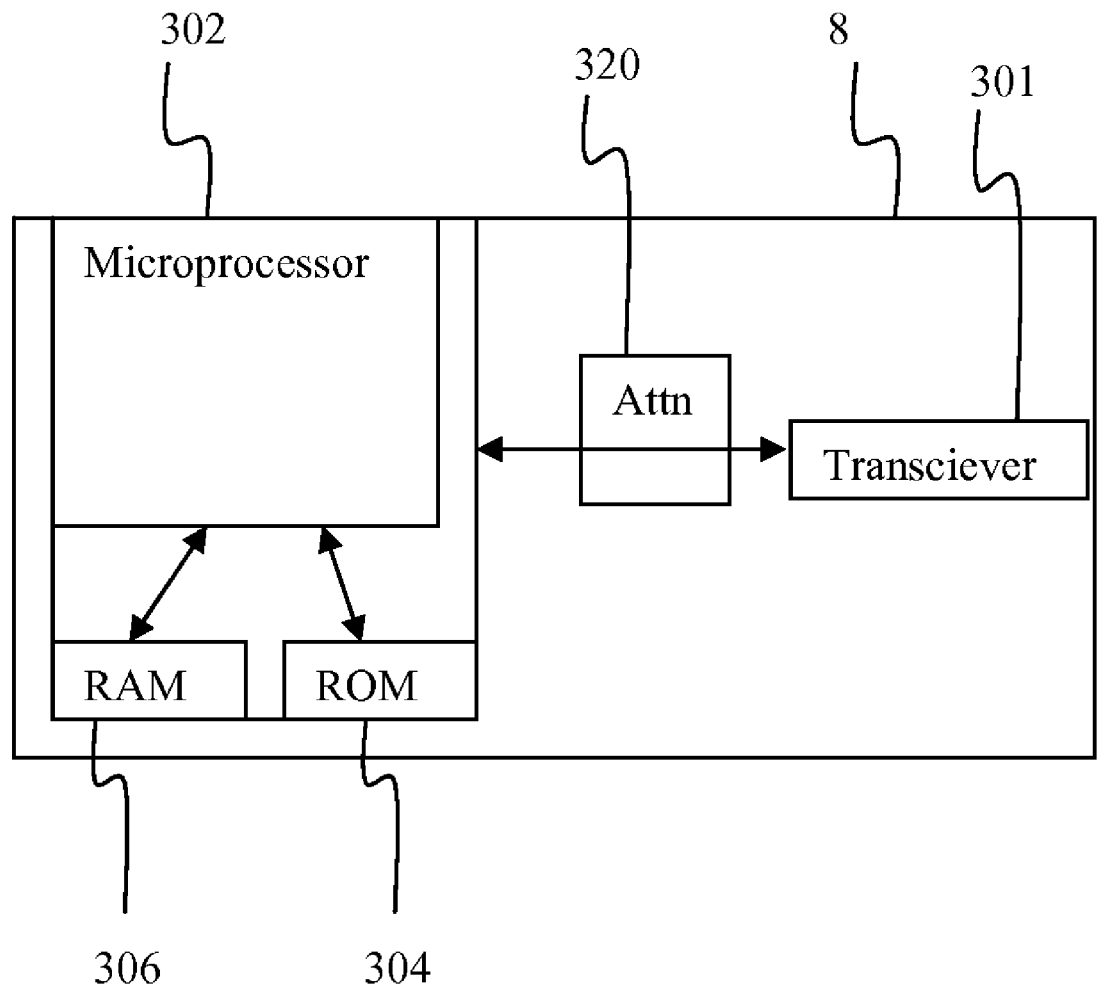
FIG. 4 illustrates an exemplary network element.

FIG. 4 illustrates an exemplary network element 8, such as a cable modem. Network element 8 preferably contains a processor 302 which may communicate with a RAM 306 and ROM 304, and which controls the general operation of the network element, including the pre-equalization parameters and preamble lengths of communications sent by the network element in accordance with instructions from the CMTS 10. Network element 8 also contains a transceiver (which includes a transmitter and receiver) which provides bidirectional RF communication with CMTS 10. Network element 8 may also contain an equalizer unit which may equalize the communications to CMTS 10. Network element 8 may also contain an attenuator 320 which may be controlled by microprocessor to attenuate signals to be transmitted to be within a desired power level. Those of skill in the art will appreciate that the components of network element 8 have been illustrated separately only for discussion purposes and that various components may be combined in practice.

Figure 5:
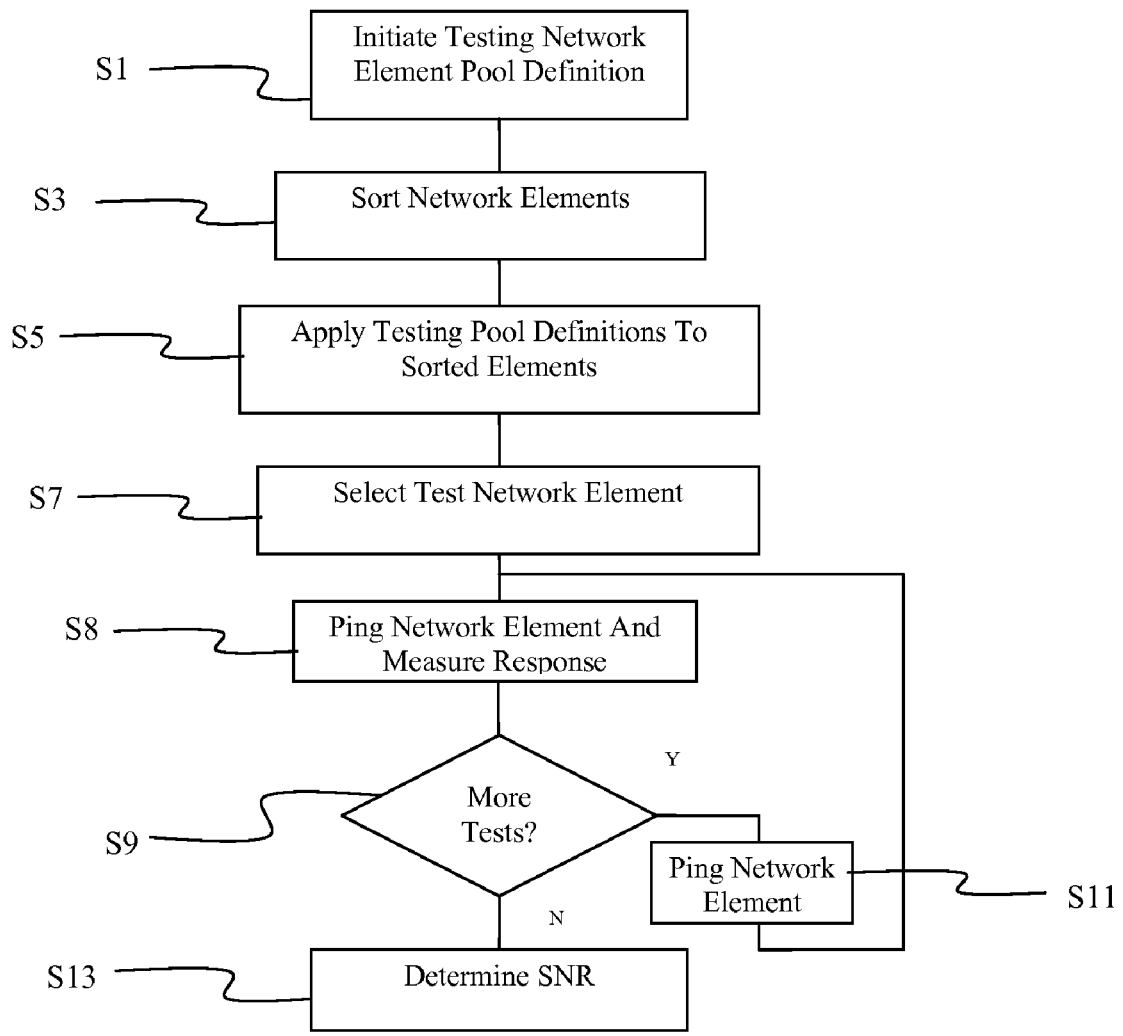
FIG. 5 illustrates an exemplary process in accordance with the principles of the present invention.

An exemplary process for automatically selecting a network element for evaluating a service group, which may be associated with a node, is illustrated in FIG. 5. The evaluation of the service group may be used by an operator to control modulation agility (to control the modulation parameters of the network communications, e.g. (QPSK, 8QAM, 16QAM, 32QAM, 64QAM, 128QAM or 256QAM). The evaluation of the service group may also be used to control frequency agility to determine a suitable frequency for a communication channel, e.g. a frequency with less noise or higher MER.

As illustrated in step S1 of FIG. 5, a process of determining the testing network element pool is initiated. The testing network element pool is the collection of network elements which are available to be used for performing the network tests, and may include active network elements. The available network elements are sorted in step S3. The sorting operation may be performed at various times and may be based on a variety of techniques. For example, the sorting operation may be performed every 5 minutes and may sort all of the network elements in increasing order of MER. Also, the software calculating the MER for a network element may use an averaged value of a period of time, e.g. over the last 5 minutes. Hence, the accumulated value and count value may be saved to be used in the next MER measurement. Those of skill in the art will appreciate that lengthening the period between the sorting operations, e.g. to every 10 minutes, could reduce processor utilization issues.

In an alternative implementation, a simple representation of the relative MER values may be used instead of the actual MER values. More precisely, what we need to know is only which network elements are exhibiting a low MER value, i.e. at this point in time we don't need the actual MER value itself. Hence, it is NOT necessary to do a full MER calculation in dB (i.e. we do not need to take the 20*LOG( ) of every network element's values). All we need to do is divide the accumulator of the MER measured valued by the count of the values. This alternative approach may also reduce the burden on the processor 100. Other metrics which may be used as the sorting criteria beyond MER include Signal to Noise Ratio (SNR), Bit Error Rate (BER), Packet Error Rate (PER), Forward Error Correction (FEC) Error Rates, Network Element Transmit Level, Signal Distortion Ratio (referred to as Microreflection level within DOCSIS), as well as other statistics.

As illustrated in step S5, testing pool definitions are applied to the sorted network elements. The testing pool definitions assist the operator in determining which network elements are suitable to be used for measuring parameters of the network. Ideally, we want to set the modulation profile as a function of the lowest MER in the network element pool. The testing pool definitions allow an operator to determine configuration parameters which define how many (poor performing) network elements may be excluded from the MER network element pool used to control the network parameters, such as the modulation agility or the frequency agility. Some operators may not want the parameters controlled by the network elements tested, such as the modulation configuration, to be potentially driven by a very small set of rogue poor-performing network elements, and instead would rather use measurements which indicate the performance of "most" of the network elements. In this scenario, the operators may allow the remaining "poor performers" to generate trouble tickets which would drive truck rolls and repairs and therefore allow the system to operate more efficiently. Similarly, other exclusionary conditions may be applied to remove network elements for consideration from the sorted list. Such exclusionary conditions may include: network elements which are actively transmitting data, network elements which are actively providing voice call services, network elements built by selected manufactures, or qualified for selected standards (such as DOCSIS 1.0, 1,1, or 2.0).

The testing pool may be defined in several ways such as: 1) percent of network elements which must support the modulation profile (e.g., 95% or 99%), or 2) number of network elements which may be excluded from the pool (e.g., 1 or 5). The definitions may be applied to the sorted network elements to pick the channel MER value. This value will then be used to base the modulation configuration decision upon. For example, let's assume we have 10 network element MER values sorted in increasing order as given in Table 1. Let's also assume that the operator configured ASPM so that the lowest 20% of network elements would be excluded from the MER decision network element pool. Since 20% of 10 network elements is 2, the lowest 2 MER values would be excluded. Therefore, ASPM would select network element 000.000.003 in the example (with a channel MER of 22.0 dB) to base its modulation agility decision. In this case, if network had been configured to use 16QAM as the modulation for a channel with an MER of 22 dB, the two network elements (operating at 13.0 and 15.0 dB MER) would probably no longer be able to pass data. The operator may also to be able to view a current list of network elements which were excluded from the list during the last measurement.

For example, the definition may be to pick any network element from the lowest 5% or 10% MER of the MER list. That is, if there are 100 network elements registered on the port, the lowest 5 may be picked; similarly if there are 200, the lowest 10 may be picked. This affords a mechanism for network elements which can not be moved to the 9th receiver (for whatever reason such as Voice call, do not move list, etc) to be removed from the list. Secondly, if a more advanced network element, e.g. a DOCIS 2.0 network element, is available in this list, it may be utilized and moved to the 9th receiver. Further, the operator may be able to manually exclude network elements from being used.

TABLE 1

| Sample MER | | |
|---|---|---|
| Network element | MER | Included in Network element Pool |
| 0000.0000.0001 | 13.0 | |
| 0000.0000.0002 | 15.0 | |
| 0000.0000.0003 | 22.0 | YES |
| 0000.0000.0004 | 22.2 | YES |
| 0000.0000.0004 | 23.0 | YES |
| 0000.0000.0005 | 23.0 | YES |
| 0000.0000.0006 | 24.0 | YES |
| 0000.0000.0007 | 26.1 | YES |
| 0000.0000.0008 | 26.2 | YES |
| 0000.0000.0009 | 26.2 | YES |
| 0000.0000.000A | 26.2 | YES |

The MER measured for a given network element can and will change over time (primarily due to in-house changes such as powering off or on various devices (set-tops, TVs, etc.) within the home), these variations are relatively infrequent, e.g., perhaps several times a day. Therefore, it may be acceptable for the MER sorting and selecting of a network element to occur less frequently than the actual measurement on the test frequency. For example, if the MER were measured on test frequencies every 3 seconds, it is not absolutely necessary that the algorithm reselect a network element every 3 seconds. This time could be slowed down to a more manageable rate of perhaps every 5 minutes or so. If processor utilization is a concern, reducing the sorting rate could help significantly.

As illustrated in step S7 of FIG. 5, a network element is selected from the pool of network elements and used to obtain an accurate MER measurement. The measurement may be made on an alternate frequency from an active channel, such as using the spare receiver, or may be made on an active channel. In a preferred implementation, the MER measurement may be performed by sending an IGMP message to the network element (such as a "ping") or using a DOCSIS station maintenance message from the headend to the selected network element, as illustrated in step S8. An exemplary technique for measuring MER using an IGMP message is described in commonly assigned U.S. Pat. No. 6,816,463 to Mike Cooper and Dan Ryan, granted on Nov. 9, 2004, herein incorporated by reference in its entirety.

As illustrated in step S9, Yes and step S11, the "ping" may preferably be sent several times, e.g. 4 times, and use the resulting MER measured from the response received from the network element. Once a desired number of "ping" tests have been performed, step S9, No, the test results are provided to the operator as illustrated in step S13, and the operator may control the network based on the results. When multiple "ping" messages are sent the MER may be calculated from the responses from the multiple "ping" messages from the selected network element, such as by being averaged. Further, when multiple "ping" messages are used, the accumulator and count values prior to the multiple "ping" test may be used with the measured MER from the multiple "ping" tests. In addition, rather than having the operator control the network based upon these results, the CMTS may automatically adjust the network configuration based upon the results.

The network element may be tested, e.g. step S8 performed, every time that the operator needs to evaluate the channel, e.g. every 3 seconds for example. By sending a "ping" to a network element, the process ensures that measurements are obtained when they are needed. More particularly, since the process uses the MER from a single network element, opposed to a plurality of random network elements, there is a significant likelihood that a network element does not transmit any data during the interval of interest if a ping request is not used. Accordingly, if the network element does not transmit, there may be intervals in which the system does not obtain an MER update. "Ping"ing the network element eliminates this possibility. In addition, industry-accepted approaches which utilize composite measurements which represent the random average of all the network elements transmitting during a given time interval are subject to the variations of which network elements are actively sending data during a given measurement interval. This may produce wide fluctuations in the resulting metric and make its use suspect at best and catastrophic in some cases. The "ping"ing of a single network element eliminates the variability and produces a single metric which may be extrapolated to predict the performance of other network elements. Further, the use of multiple pings may also reduce the affect of transient signals in the upstream communication by "averaging away" the transient activity, e.g. one transient in four pings means it will only contribute to 25% of the MER.

In an alternative embodiment, the MER from each individual ping may be determined and transients may be individually determined. The transients may be removed from an average.

The CMTS spare receiver is preferably used to obtain the MER measurements to avoid impacting service provided to customers. When the spare receiver is used, the return communication channels may be active, hence avoiding a disruption in active service at the time the operator desires to perform the tests. Alternatively, another receiver could be used to make the measurements by being taken "off line" or by adjusting for the impact caused by normal service.

The processes in FIG. 5 may be implemented in hard wired devices, firmware or software running in a processor. A processing unit for a software or firmware implementation is preferably contained in the CMTS. Any of the processes illustrated in FIG. 5 may be contained on a computer readable medium which may be read by microprocessor 102. A computer readable medium may be any medium capable of carrying instructions to be performed by a microprocessor, including a CD disc, DVD disc, magnetic or optical disc, tape, silicon based removable or non-removable memory, packetized or non-packetized wireline or wireless transmission signals.

The invention enables the technician or engineer to determine a reliable network element to perform tests on the network. The invention also enables the tests to be performed without impacting active services. All measurements may be made through the use of the existing terminal devices (specifically, DOCSIS terminal devices such as MTAs and cable modems) as well as headend equipment (specifically a DOCSIS CMTS). The approach described herein is also faster and more reliable in determining measurements than waiting for random response from all of the network elements.

What is claimed is:

1. An apparatus for monitoring a network comprising:
    a microprocessor configured to sort a plurality of network elements according to a network parameter indicative of performance of the network element, to apply a testing pool definition to the plurality of network elements, the testing pool definition specifying configuration parameters identifying network elements suitable for determining performance of the network and removing network elements for consideration as a test network element, to select a network element of the plurality of network elements as a test network element from the network elements identified as suitable for determining performance of the network based on the testing pool definition, and to send a test signal to the test network element; and
    a receiver configured to receive a response to the test signal from the test network element,
    wherein the apparatus monitors the network using responses to the test signal from only the test network element, which is indicative of the communication parameters of a majority of the network elements of the plurality of network elements, to control a parameter of the network, and
    wherein the network communicates with at least a subset of the plurality of network elements via burst communications and a common frequency.

2. The apparatus of claim 1, wherein the plurality of network elements are sorted according to one or more of their: signal to noise ratio, modulation error ratio, packet error rate, burst error rate, forward error correction error rates, network element transmit level, or signal distortion ratio.

3. The apparatus of claim 1, wherein the testing pool definition includes a percentage of network elements which support a modulation profile.

4. The apparatus of claim 1, wherein the testing pool definition includes the network element with one or more of the lowest: signal to noise ratio, modulation error ratio, packet error rate, burst error rate, forward error correction error rates, network element transmit level, or signal distortion ratio.

5. A method of identifying a network element to use for testing a network comprising the steps of:
    sorting a plurality of network elements based on one or more network parameters;
    applying a testing pool definition to the plurality of network elements, the testing pool definition specifying configuration parameters identifying network elements suitable for determining performance of the network and removing network elements for consideration as a test network element; and
    selecting a network element from the plurality of network elements identified as suitable for determining performance of the network by application of the testing pool definition as the test network element based on the testing pool definition,
    wherein a network uses responses from only the test network element, which is indicative of the communication parameters of a majority of the network elements of the plurality of network elements, to control a parameter of the network, and
    wherein the network communicates with at least a subset of the plurality of network elements via burst communications and a common frequency.

6. The method of claim 5, wherein the plurality of network elements are sorted according to one or more of their: signal to noise ratio, modulation error ratio, packet error rate, burst error rate, forward error correction error rates, network element transmit level, or signal distortion ratio.

7. The method of claim 5, wherein the testing pool definition includes a percentage of network elements which support a modulation profile.

8. The method of claim 5, wherein the testing pool definition includes the network element with one or more of the lowest: signal to noise ratio, modulation error ratio, packet error rate, burst error rate, forward error correction error rates, network element transmit level, or signal distortion ratio.

9. The method of claim 5, wherein the controlled parameter of the network includes at least one of modulation type, channel frequency, forward error correction configuration, and preamble lengths.

10. A non-transitory computer readable medium carrying instructions for a computer to perform a method of identifying a network element to use for testing a network comprising the steps of:
    sorting a plurality of network elements based on one or more network parameters;
    applying a testing pool definition to the plurality of network elements, the testing pool definition specifying configuration parameters identifying network elements suitable for determining performance of the network and removing network elements for consideration as a test network element; and
    selecting a network element from the plurality of network elements identified as suitable for determining performance of the network by application of the testing pool definition as the test network element based on the testing pool definition,
    wherein a network uses responses from only the test network element, which is indicative of the communication parameters of a majority of the network elements of the plurality of network elements, to control a parameter of the network, and
    wherein the network communicates with at least a subset of the plurality of network elements via burst communications and a common frequency.

11. The computer readable medium of claim 10, wherein the plurality of network elements are sorted according to one or more of their: signal to noise ratio, modulation error ratio, packet error rate, burst error rate, forward error correction error rates, network element transmit level, or signal distortion ratio.

12. The computer readable medium of claim 10, wherein the testing pool definition includes a percentage of network elements which support a modulation profile.

13. The computer readable medium of claim 10, wherein the testing pool definition includes the network element with one or more of the lowest: signal to noise ratio, modulation error ratio, packet error rate, burst error rate, forward error correction error rates, network element transmit level, or signal distortion ratio.

14. The computer readable medium of claim 10, wherein the controlled parameter of the network includes at least one of modulation type, channel frequency, forward error correction configuration, and preamble lengths.

* * * * *